(12) United States Patent
Sisk

(10) Patent No.: US 9,328,855 B2
(45) Date of Patent: May 3, 2016

(54) TEE AND UNLOAD LINE WITH INTEGRATED CAM LOCK

(71) Applicant: David E. Sisk, Bonne Terre, MO (US)

(72) Inventor: David E. Sisk, Bonne Terre, MO (US)

(73) Assignee: Bulk Tank, Inc., Park Hills, MO (US)

( * ) Notice: Subject to any disclaimer, the term of this patent is extended or adjusted under 35 U.S.C. 154(b) by 0 days.

(21) Appl. No.: 13/987,852

(22) Filed: Sep. 9, 2013

(65) Prior Publication Data

US 2014/0084581 A1 Mar. 27, 2014

Related U.S. Application Data

(60) Provisional application No. 61/744,389, filed on Sep. 26, 2012.

(51) Int. Cl.
*F16L 37/18* (2006.01)
*F16L 41/02* (2006.01)

(52) U.S. Cl.
CPC .............. *F16L 37/18* (2013.01); *F16L 41/021* (2013.01)

(58) Field of Classification Search
USPC ............... 285/320, 133.11, 133.21, 87, 91
See application file for complete search history.

(56) References Cited

U.S. PATENT DOCUMENTS

| | | | | |
|---|---|---|---|---|
| 2,187,119 A * | 1/1940 | Fish | .............................. | 285/320 |
| 2,188,587 A * | 1/1940 | Ames | .............................. | 285/320 |
| 2,490,907 A * | 12/1949 | Kellaher et al. | ............... | 285/320 |
| 2,770,474 A * | 11/1956 | Krapp | ............................ | 285/320 |
| 4,295,670 A | 10/1981 | Goodall et al. | | |
| 4,519,635 A * | 5/1985 | McMath | ......................... | 285/91 |
| 4,618,171 A * | 10/1986 | Fahl | ................................. | 285/93 |
| 4,691,942 A * | 9/1987 | Ford | ................................. | 285/84 |
| 4,722,555 A * | 2/1988 | Soultatis | .................. | 285/133.11 |
| 4,802,694 A * | 2/1989 | Vargo | ............................ | 285/87 |
| 5,042,850 A * | 8/1991 | Culler | ........................... | 285/320 |
| 5,375,730 A * | 12/1994 | Bahr et al. | .................... | 285/312 |
| 6,786,362 B2 | 9/2004 | Sisk | | |
| 7,150,474 B2 * | 12/2006 | Cary | ........................ | 285/133.11 |
| 7,207,602 B2 * | 4/2007 | Burian et al. | ............. | 285/133.11 |
| 7,354,077 B1 * | 4/2008 | Jumonville | ................... | 285/320 |
| 7,543,857 B2 * | 6/2009 | Dole | ............................ | 285/320 |
| 7,988,386 B2 * | 8/2011 | Sisk | ........................ | 285/133.11 |
| 8,091,925 B2 | 1/2012 | Sisk | | |
| D673,657 S * | 1/2013 | Sisk | ............................ | D23/262 |
| 8,827,320 B2 * | 9/2014 | Topacio | ....................... | 285/320 |
| D722,140 S * | 2/2015 | Sisk | ............................. | D23/262 |

* cited by examiner

*Primary Examiner* — David E Bochna
(74) *Attorney, Agent, or Firm* — Paul M. Denk

(57) ABSTRACT

A grooved lock coupler for holding a tee to a flow line for forced air conveyance and unloading of dry bulk granular material from a storage container vehicle is disclosed which comprises a tee having a first end, a second end, an inlet end, and a circumferential groove provided on the first end and a coupler for interconnecting to a flow line from the tee, the coupler having a cam lock fastener pivotally mounted on the coupler, the cam lock fastener cooperating with an opening in the coupler proximate the fastener to allow for the cam lock to extend through the opening in the coupler and to engage within the groove to lock the flow line and coupler to the tee in preparation for an unloading process.

2 Claims, 6 Drawing Sheets

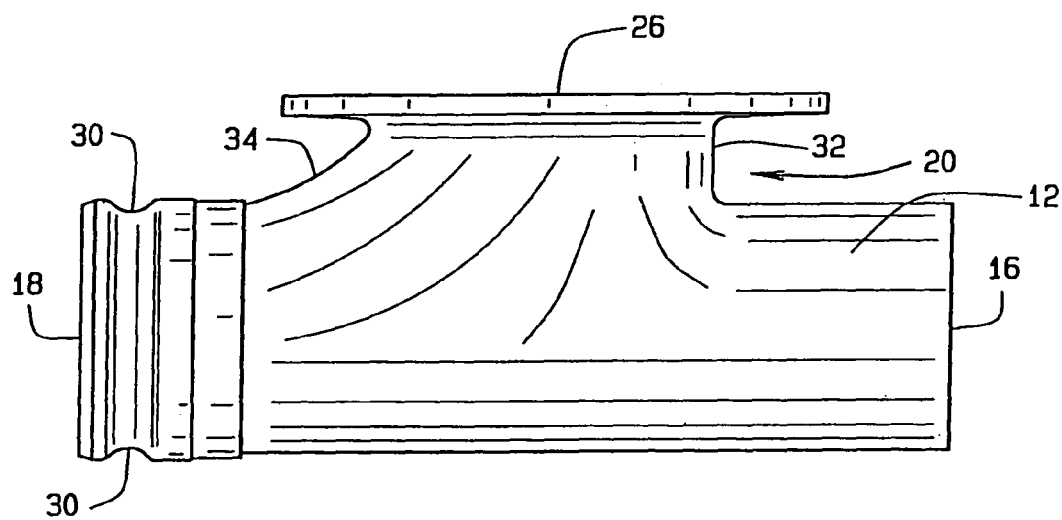
FIG. 3
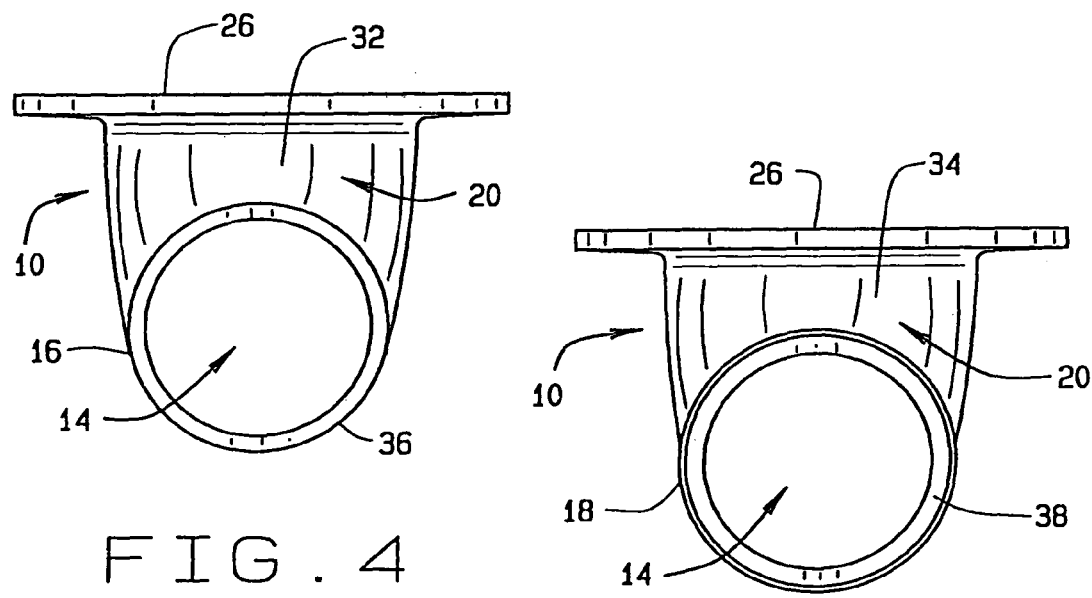
FIG. 4
FIG. 5

TEE AND UNLOAD LINE WITH INTEGRATED CAM LOCK

CROSS REFERENCE TO RELATED APPLICATION

This application claims priority to the provisional patent application having Ser. No. 61/744,389, filed on Sep. 26, 2012, design patent application having Ser. No. 29/421,194, filed on Jun. 12, 2012, which claimed priority to the non-provisional patent application having Ser. No. 13/200,625, filed on Sep. 27, 2011, which claimed priority to the non-provisional patent application having Ser. No. 12/249,672, filed on Oct. 10, 2008, now U.S. Pat. No. 8,091,925, which claimed priority to the provisional patent application having Ser. No. 61/030,777, filed on Feb. 22, 2008, Ser. No. 12/364,643, now U.S. Pat. No. 7,988,386, and which is related to U.S. Pat. No. 6,786,362, which also claimed priority to the continuation-in-part design patent application having Ser. No. 29/395,947, filed on Apr. 26, 2012, which claimed priority to the design patent application having Ser. No. 29/362,245, filed on May 21, 2010, and also claimed priority to the provisional patent application having Ser. No. 61/688,864, filed on May 23, 2012.

FIELD OF THE DISCLOSURE

This disclosure relates to a device for interconnecting an unloading hose, or flow line, which predominantly conveys dry bulk material during an unloading process, or even during a loading process, to a tank trailer, railroad car, or other storage device. The present disclosure incorporates a tee and an unloading hose, which are contoured to cooperate with an integrated cam lock mechanism, that may be embodied upon the tee, or the unload line, to provide a unique and quick interconnection between the two, when prepared primarily for the unloading of dry bulk material or granular material.

BACKGROUND

Granular product or dry bulk material, such as grain or corn, may be stored and shipped in bulk containers such as railroad tank cars, tank trailers, hoppers, and pipelines for transportation from one site to be delivered to another site. The delivered product exits from the storage compartment of the transport carrier, such as its tank trailer, through a tee attached to the bottom of the trailer. The tee is connected to a source of pressurized air for assisting and directing the exiting material into a hose or a pipe. The exiting material then flows through the hose or the pipe for delivery to a storage facility or location of usage.

Numerous types of tees, and flow lines, principally for conveying dry bulk granular product or material from a tank trailer have long been available. Usually the tee will connect onto the bottom of a discharge port from the tank trailer, to deposit the granular material by gravity into the flow line, while pressurized air introduced into and also flowing through the flow line, and the tee, conveys the granular material to another location, for either storage or other uses and processing. Typically, the types of prior art couplers that were normally employed to interconnect the flow line with the tee would include an older cam lock interconnecting device, which generally changed the internal diameters of the flow line, as it transitioned onto the tee, and exiting the same, so as to cause a turbulence and disruption in the flow of the granular material as it was being conveyed from the tank trailer. In addition, interconnecting of such flow lines to the tee through the older style of lock required some physical dexterity, to get these two parts interconnected, and to operate satisfactorily. The transition from the tee to within the flow line usually provided a change to a different diameter, which could disrupt the routine of flow of the granular material under air pressure, and cause such turbulence to effect a reduction in the speed and efficiency of the unloading process. This further caused a pressure drop during usage of such prior art devices which also reduced the speed and efficiency of the unloading process. Furthermore, the use of the locking cams, within their grooves, would result in excessive wear to the entire tee, and which would necessitate a replacement of the tee, on a more frequent basis, than desired.

Furthermore, the usual form of interconnection of the cam locking device, of the older prior art styles, would necessitate a threaded connection of its coupling with the flow line, and which would create that inequality in the internal diameters between the cam lock coupling, and the hose and pipe to which it connected, which caused the type of disruption in flow, as previously reviewed, which would lead to inefficiencies in discharge of the dry bulk material, and an undesired pressure drop, during usage.

Another prior art type of means for connection of the flow line and its pipe to the tee included that threaded fitting, that would screw onto the approximate end of the tee, and the problem with this type of connection is that usually some of the threads formed internally of a coupler would be exposed to the passing granular material, and hence, once again, caused disruption of flow, turbulence in the movement of the dry bulk material, which would lessen, once again, the efficiency of conveyance of the bulk material from the tank trailer, etc., to a distant location for either unloading, storage, or for further processing. The female threads contained within its coupler would remain exposed when tightened on the male threads of the tee of this prior art type device, and which could also create an area for contamination, where the bulk material may become embedded, and soiled (see FIG. 8). As previously reviewed in earlier patents, the trapping of the bulk material from one load, if it gets intermixed with another or subsequent load of a different bulk material, can and would contaminate, and in some instances, require an entire disposal as waste of the later conveyed dry material. Furthermore, having exposed threads within the flow line, from the threaded coupler, also furnished an abrasive location, where disruption of the flow of the granular material would occur, thereby acting as an excessive friction and wear point, leading towards a wear out of the tee, and its coupler, at that location, requiring their total replacement.

A further type of coupling means, used in the prior art, would provide a perimeter clamp that would surround and span the gap between the end of the coupler, and the end of the tee, to secure the two together. The problem with that type of coupling was that there was normally a gap formed between these two components, and the gap between the fitting and the flow line or pipe was a source for contamination, and wear, as aforesaid, that would accelerate the fatigue of the components, at that location, as a result thereof. In addition, the use of that type of a fitting coupler would require the acquisition and use of an additional form of a grooved coupler, to hold the pipe or flow line in place, and to connect with the previously defined tee coupler.

The concept of this current disclosure is to greatly simplify and accelerate the interconnection of the pipe or flow line to a tee, through a cam coupler, that has uniformity of internal diameter and contours, and also assumes a quick interconnection through the use of its cam locking feature, that is unexposed to any bulk material passing through the tee or flow line, and which interconnection can be readily made by an individual worker, between the flow pipe, through the tee, during an unloading process.

SUMMARY OF THE DISCLOSURE

The present disclosure contemplates the formation of a tee, that cooperates with a coupler, for securement of an unloading hose or line to it, so that once the coupler and the unloading line is connected with the tee, it furnishes a smooth uniformed uninterrupted interior surface that has no effect upon the flow of granular material therethrough, such as when this tee, and its flow line, are connected into means for conveying of granular material from a tank trailer, or the like. Generally, the tee will fit inside the coupler, to place it into alignment with the unloading hose, so as to create a smooth interior surface for the flow line, while exteriorly, a series of cam lock fasteners may be used for holding the coupler and the hose to the tee, or for holding the coupler and the tee to the hose, when providing for their interconnection, in preparation for usage. Their installation can be done rather expeditiously, since only a pair or more of cam locking fasteners are needed to secure these components together, when assembled for conveying purposes.

In the overall structure of the present device, the device forms a grooved lock coupler integrated upon the surface of the tee, as when assembling the flow line to the tee, through the coupler, to attain the unloading of any granular material. The disclosure is directed to a tee, with the tee being formed having its usual ends, and the tee having a circumferentially positioned groove provided at least at approximately one end of the tee, when fabricated, molded, or cast. A coupler is provided for interconnecting with the flow line, to the tee. The coupler may fit upon or into the flow line, and be fastened in place by means of one or more bands, or other means for connection. The coupler has at least a pair of bosses formed integrally thereon, and each pair of bosses are provided for securement of a cam lock thereon, such that when the coupler is placed over the proximate end of the tee, each cam lock can be pivoted into connection for locking within the tee circumferential groove, as previously described. All of this type of assembly can be easily performed by a single installer, when preparing the flow line for unloading of the dry granular material.

It is also likely that the tee itself may include at least a pair of cam locking fasteners, at its proximate end, and the coupler itself may have a circumferential groove provided therearound, so that when the coupler, secured to the hose, is applied into the end of the tee, the cam locks provided upon the tee end will be pivoted into locking engagement within the groove of the hose coupler, to provide for an immediate securement of these components together, in readying the tee and the unloading hose for an unloading of the bulk material laden tank trailer.

It should be recognized that the present disclosure provides a device for holding a coupler and flow line onto the end of a tee, through the use of cam locking mechanisms, and through the use of very little manual effort when assembling the installation for granular material discharge from a tank trailer.

The present disclosure is also directed to a device for securement of a flow line coupler to a tee, where its internal surfaces are maintained uniform, and present no obstruction to the free flow of granular material therethrough.

The present disclosure provides a coupler that secures with the end of the tee, and provides no location where granular material can become embedded, which may give rise to contamination of subsequently conveyed dry bulk material, which can lead to expensive disposal of the contaminated load.

The present disclosure also provides a tee and coupler that can be easily attached or assembled by a single installer.

The present disclosure is further directed to a device for interconnecting a flow line coupler onto the end of a tee, and incorporating internally thereof a smooth transition to eliminate any type of contamination built up, or wear out of the internal surfaces of the assembly, during its continued usage.

The present disclosure also provides a device having grooves, integrally upon the end of a tee, and which provide for retention of a coupler, to the tee, that enhances its useful life during repeat applications for unloading granular material.

The present disclosure is directed to a tee, with a formed integral groove furnished upon at least one end, and which may connect through the use of a pair of cam locks for securement of an unloading-flow line-to-the-tee during usage.

These and other advantages of the present disclosure will become apparent to those skilled in the art after considering the following detailed specification in conjunction with the accompanying drawings.

BRIEF DESCRIPTION OF THE DRAWINGS

In referring to the drawings:

FIG. 3 is an opposite side view of the tee shown in FIG. 1, showing a circumferential location of a connecting groove;

FIG. 4 is a back view of the tee shown in FIG. 1;

FIG. 5 is a front view of the tee shown in FIG. 1;

DETAILED DESCRIPTION OF PREFERRED EMBODIMENTS

Figure 1:
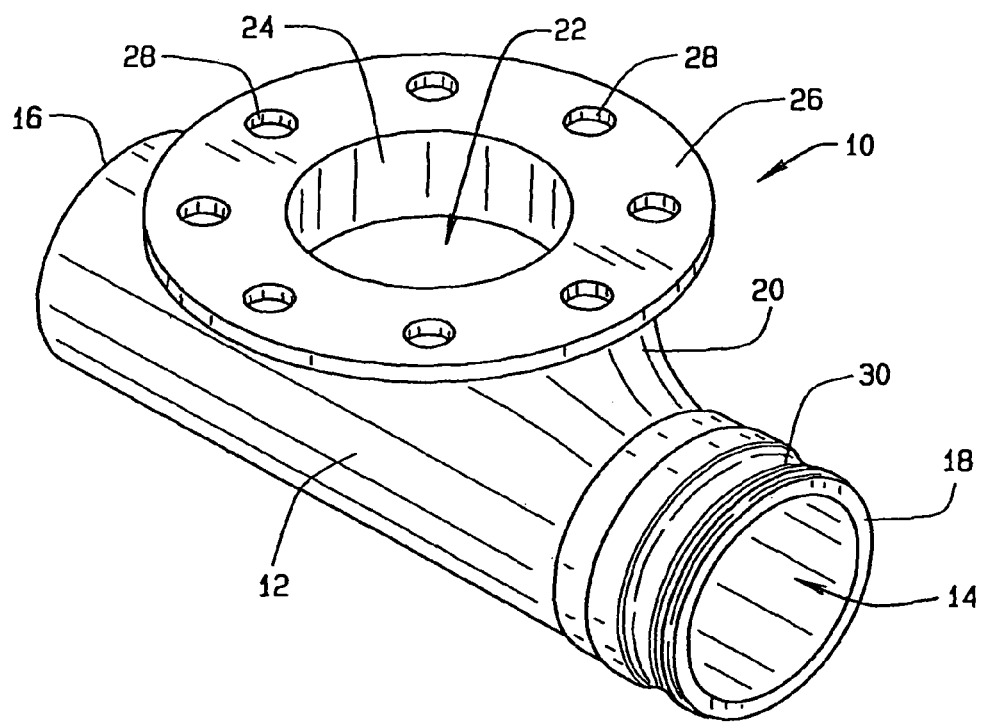
FIG. 1 is an isometric view of a formed tee constructed according to the present disclosure, showing an internal groove formed at an end of the tee.

Referring now to the drawings, wherein like numbers refer to like items, number 10 identifies a preferred embodiment of a tee constructed according to the present disclosure. With reference now to FIG. 1, the tee 10 comprises a longitudinal flow body or section 12 having an interior longitudinal channel 14 that extends from a first end 16 to a second end 18. The tee 10 has an upstanding portion 20 leading towards an inlet end 22 that has a vertical channel 24. An integral flange 26 is provided at the inlet end 22 having a number of bolt holes 28. The second end 18 is formed having an exterior annular groove 30. The first end 16 is adapted to being connected to a source of pressurized air. The inlet end 22 is adapted to being connected to an underside of a tank trailer, railroad car, hopper, or other storage device that has contained therein granular material or dry bulk material such as grain or corn. Bolts (not shown) may be used to bolt the tee 10 through the bolt holes 28 provided in the flange 26 to the underside of a tank trailer. Granular material may fall from the tank trailer down the vertical channel 24 to flow out of the second end 18 within the pressurized air flow to convey the material to another location for unloading or further processing. The pressurized air enters from the first end 16 and exits with the entrained bulk material through the channel 14 and out the second end 18.

Figure 2:
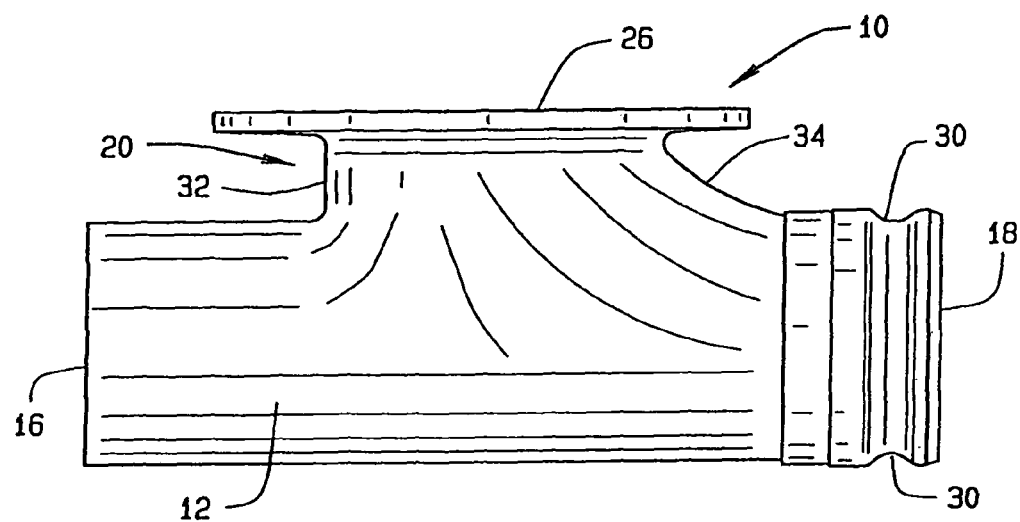
FIG. 2 is a side view of the tee shown in FIG. 1.

FIG. 2 shows a side view of the tee 10. The tee 10 has body 12 having the first or pressurized air inlet end 16 and the second or outlet end 18. The second end 18 has the groove 30 formed therein and is used to accept a connection device (not shown), as will be discussed in detail further herein. The tee 10 also has the upstanding portion 20 and the flange 26. The upstanding portion 20 has a first end 32 that is generally straight and parallel to the first end 16. The upstanding portion 20 also has a second end 34 that is sloped from the flange 26 toward the second end 18. In this manner, the second end 34 assists in directing the flow of granular material in the tee 10 from the inlet end 22 toward the outlet end 18.

With reference now to FIG. 3, an opposite side view of the tee 10 is illustrated. The tee 10 has the annular groove 30 formed in the second end 18. The groove 30 continues around the entire second end 18. The body 12 is shown having the first end 16 and the second end 18. The upstanding portion 20 has the second end 34 that is sloped downwardly from the flange 26 to the second end 18.

FIG. 4 is a perspective view of the first end 16 of the tee 10. The first end 16 serves as the inlet for a source of pressurized air that is injected into the channel 14 to flow through the channel 14. As seen from the first end 16, the channel 14 provides an unobstructed pathway for both pressurized air to flow and granular material to flow. The tee 10 also has the first end 32 of the upstanding portion 20 and the flange 26. The first end 16 has a circular opening 36 and is adapted for receiving a conduit such as a hose.

With reference now to FIG. 5, a perspective view of the second end 18 of the tee 10 is shown. The second end 18 is provided to allow both the pressurized air and granular material to flow through the channel 14 and to exit out of the second end 18. The channel 14, as seen through the second end 18, is smooth and unobstructed. The second end 18 has a circular opening 38. The tee 10 also has the second end 34 of the upstanding portion 20 and the flange 26.

Figure 6:
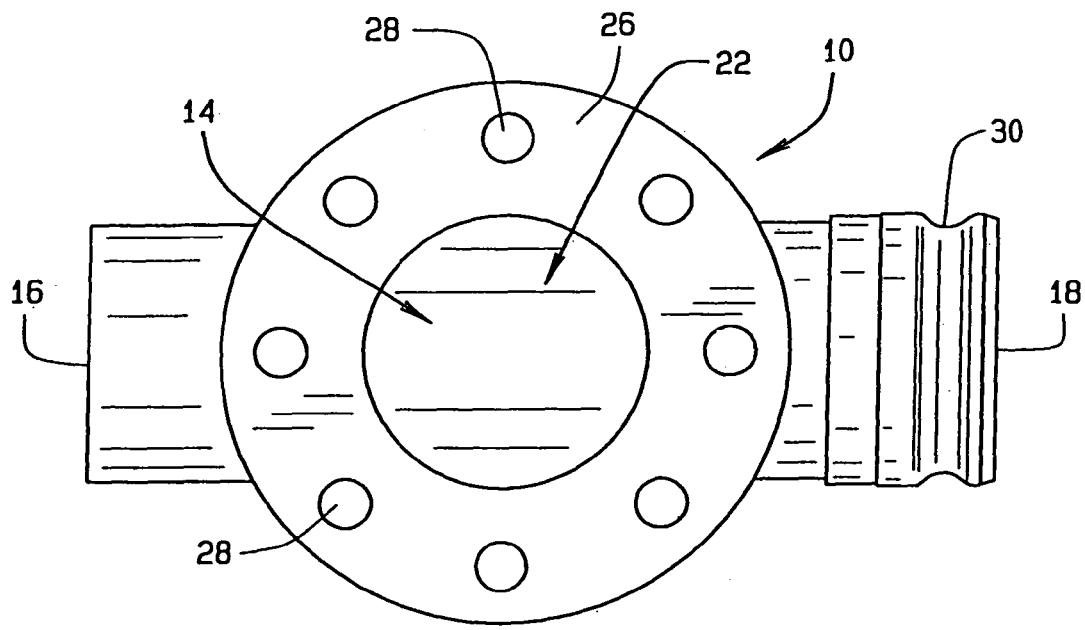
FIG. 6 is a top plan view of the tee shown in FIG. 1.

FIG. 6 is a top view of the tee 10. The flange 26 is circular in shape and has the bolt holes 28 spaced about the flange 26. The inlet end 22 is within the flange 26 and the channel 14 is shown therethrough. Any granular material that falls or flows through the inlet end 22 will pass through the channel 14 toward the outlet or second end 18. The second end 18 has the groove 30.

Figure 7:
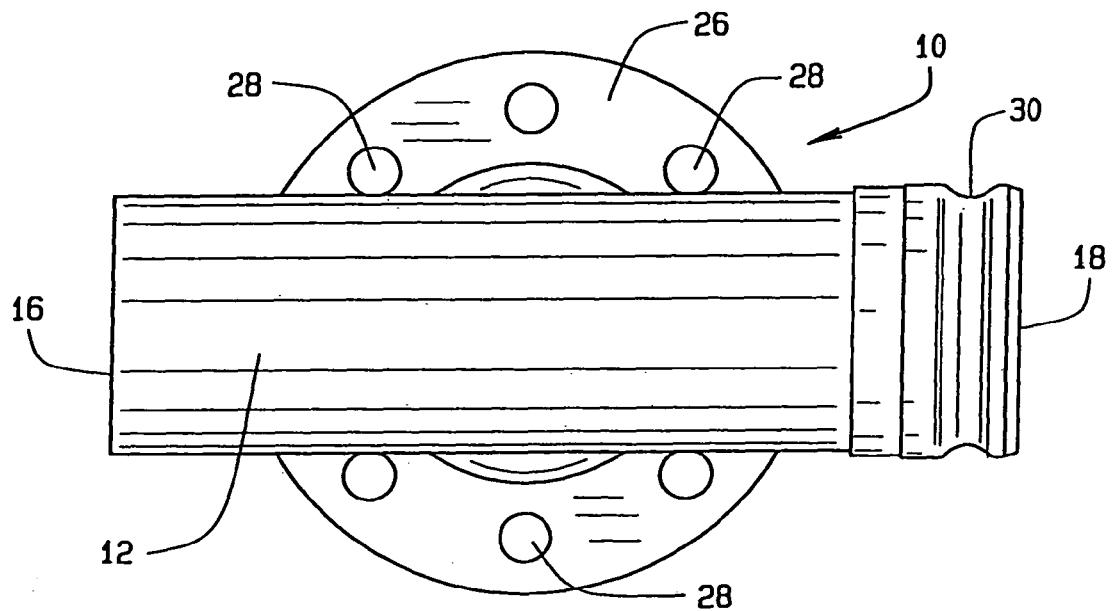
FIG. 7 is a bottom view of the tee shown in FIG. 1.

Referring now to FIG. 7, a bottom view of the tee 10 are depicted. The tee 10 has the body 12 which is generally a cylinder or pipe to allow pressurized air to flow through from the first end 16 to the second end 18. The flange 26 is circular in shape having the bolt holes spaced equally about the flange 26. The bolt holes 28 allow bolts (not shown) to be passed therethrough to bolt or secure the tee 10 to an underside of a tank trailer that has stored therein a supply of granular material.

Figure 8:
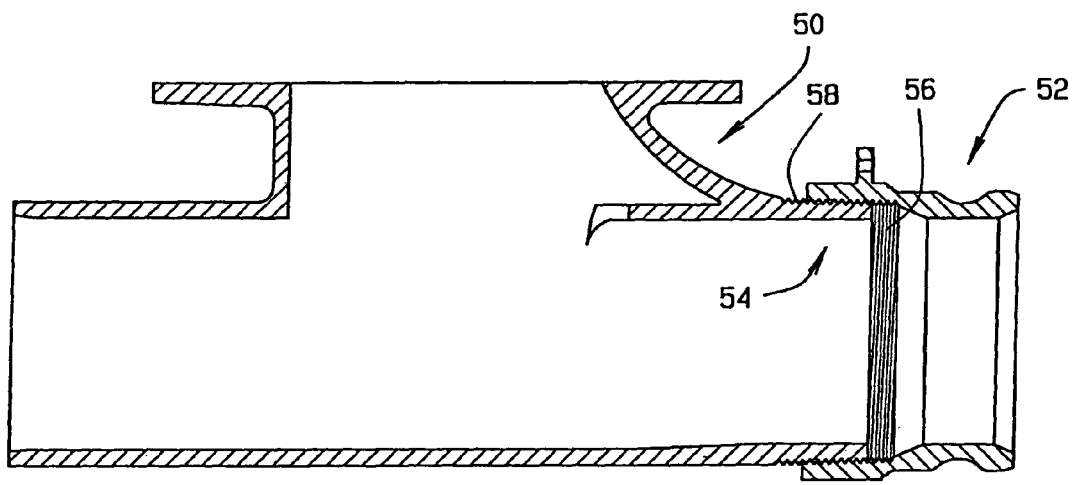
FIG. 8 is a cross-sectional view of a prior art tee having a coupler threadedly engaged on the tee, leaving exposed threads, and a stepped location where granular material may accumulate during unloading.

FIG. 8 illustrates a cross-sectional view of a prior art tee 50 and a coupling device 52. The prior art tee 50 has a threaded end 54 upon which is threaded the coupling device 52. The coupling device 52 has female threads 56 which remain exposed when tightened onto male threads 58 of the tee 50. Since the female threads 56 are exposed the threads 56 are subject to collecting bulk material that flows through the tee 50 and the coupling device 52. Bulk material may become embedded in the female threads 56. This can lead to contamination of subsequent loads of material. As has been discussed, contamination should be avoided.

Figure 9:
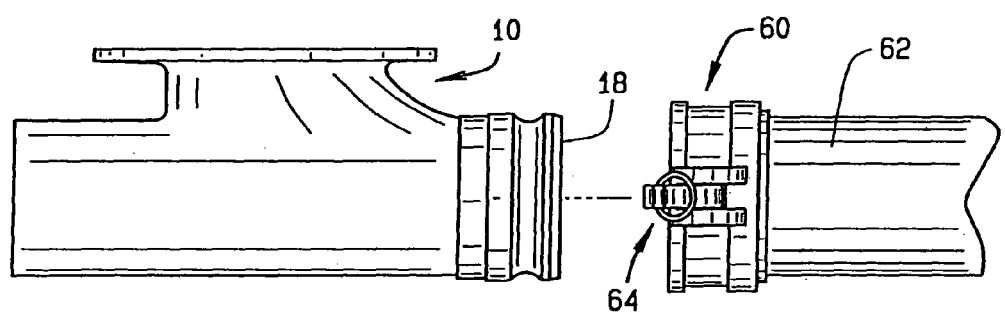
FIG. 9 is a side perspective view of a tee constructed according to the present disclosure with a coupler and an unloading hose aligned for installation onto the tee in preparation for an unloading procedure.

With reference now to FIG. 9, a coupler or coupling device 60 positioned on a discharge hose or conduit 62. The coupler 60 is in position to be placed over the second end 18 of the tee 10. The coupler 60 has a first cam lock fastener or mechanism 64 that is used to connect, lock, or clamp the coupler 60 to the second end 18 of the tee 10. When the coupler 60 is placed over the second end 18, the first cam lock mechanism 64 may be operated to secure the coupler 60 to the second end 18.

Figure 10:
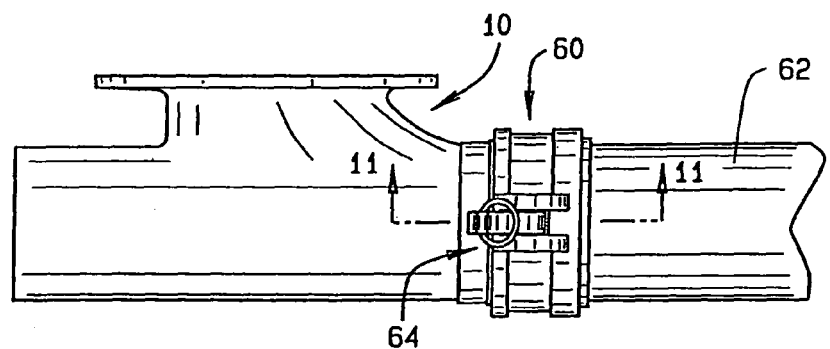
FIG. 10 is a side perspective view of the tee shown in FIG. 9 with the coupler and the unloading hose interconnected by a cam lock fastener onto the tee.

FIG. 10 shows the coupler 60 being inserted onto the second end 18 of the tee 10. The cam lock mechanism 64 has not been actuated to connect the coupler 60 to the tee 10. The coupler 60 fits over the groove 30 of the second end 18. As will be explained, the cam lock mechanism 64 and the groove 30 cooperate together to lock the coupler 60 to the second end 18 of the tee 10.

Figure 11:
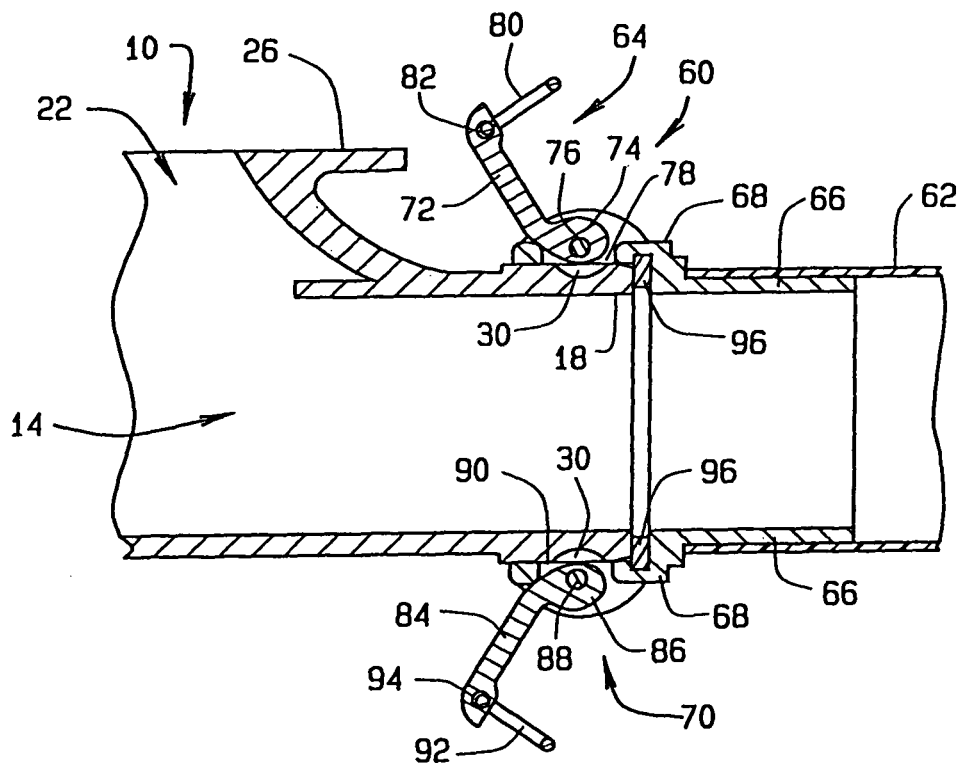
FIG. 11 is a partial cross-sectional view of the tee taken along the plane of line 11-11 of FIG. 10 showing a pair of cam lock fasteners prior to being fastened.

Referring now in particular to FIG. 11, a cross-sectional view of the coupler 60 being inserted over the second end 18 of the tee 10 is shown. The coupler 60 has an extension member 66 that extends into the hose 62. The member 66 may be secured to the hose 62 by a locking band 67 or by any other suitable securing device. The coupling 60 has an outer sleeve 68 that receives the second end 18 of the tee 10. The coupler 60 is shown having the first cam lock mechanism 64 and a second cam lock mechanism 70. Although two cam lock mechanisms 64 and 70 are shown, it is possible to have more than two. The first cam lock mechanism 64 comprises a cam arm member 72 having an integral cam 74 mounted on a pivot pin 76. The cam arm member 72 is used to pivot the integral cam 74 about the pivot pin 76. The outer sleeve 68 has a first slot 78 through which the integral cam 74 may pass to contact the groove 30. A ring 80 is attached to the cam arm 72 through an aperture 82 formed in the cam arm 72. The second cam lock mechanism 70 comprises a cam arm member 84 having an integral cam 86 mounted on a pivot pin 88. The cam arm member 84 may be pivoted about the pivot pin 88 to move or rotate the integral cam 86. The outer sleeve 68 also has a second slot 90 formed therein through which the integral cam 86 may enter to contact the groove 30 on the tee 10. A ring 92 is connected to the cam arm 84 through an aperture 94 provided in the cam arm 84. A gasket 96 may be provided between the second end 18 and the coupler 60 to align the tee 10 with the coupler 60. The gasket 96 also provides for a uniformity of diameter between the tee 10 and the coupler 60 to assure that there is no area where any bulk material can accumulate or become embedded. Thus, the channel 14 of the tee 10 and the coupler 60 has a continuous uniform flow path so that there is a smooth flow contour between the tee 10 and the coupler 60 when connected together. Also, there is no gap between the tee 10 and the coupler 60 when both these components are connected together.

Figure 12:
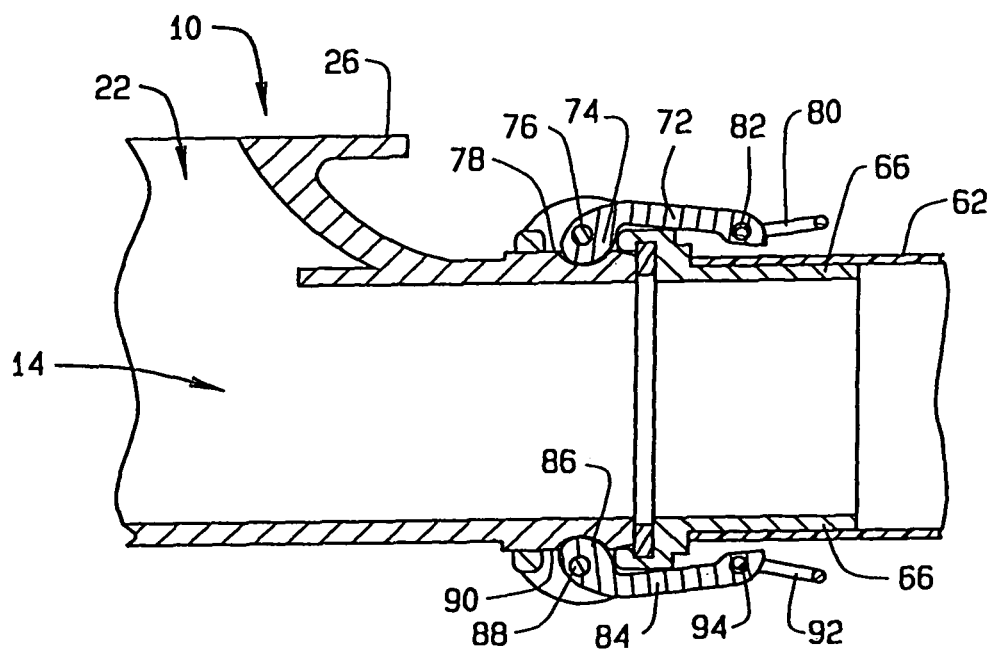
FIG. 12 is a partial cross-sectional view of the tee shown in FIG. 11 with the pair of cam lock fasteners being fastened.

FIG. 12 shows a cross-sectional view of the coupler 60 and the tee 10 connected together and the cam lock mechanisms 64 and 70 both in a locked position. The cam arm 72 has been pressed down to pivot the integral cam 74 into the groove 30. The cam arm 84 has also been pivoted downwardly to move the integral cam 86 into engagement with the groove 30. With the integral cams 74 and 86 engaging the groove 30, the coupler 60 will be locked in place on the second end 18 of the tee 10. An unloading procedure or process may take place when the coupler 60 is secured to the tee 10. Also, the rings 80 and 92 may be tied down, or otherwise secured, to maintain the cam lock mechanisms 64 and 70 in the locked position. This will prevent any inadvertent or untimely decoupling or disconnection, particularly while unloading a large volume of dry bulk material. A single installer may easily position the coupler 60 onto the tee 10 and then press down on both the arms 72 and 84 to lock the coupler 60 in place. Further, due to the groove 30, no specific positioning of the tee 10 within the coupler 60 is required. This eliminates any time required to determine how to couple the tee 10 and the coupler 60 together.

Figure 13:
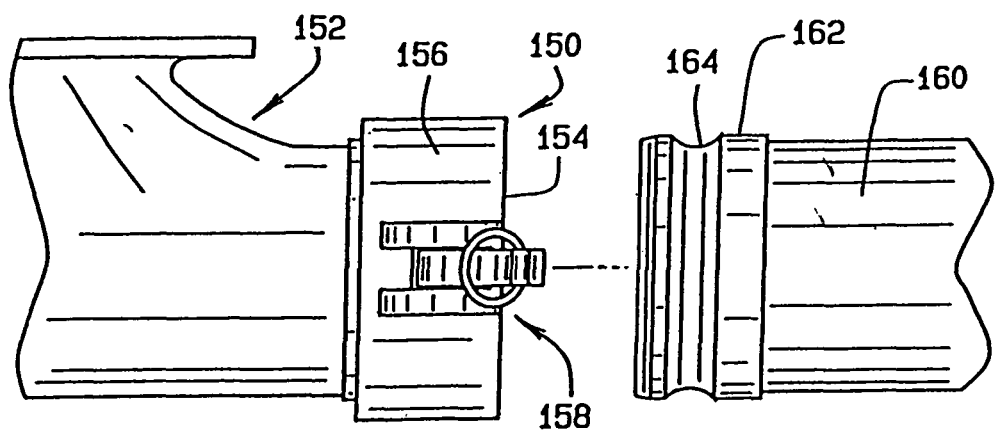
FIG. 13 is a perspective view of another embodiment of a tee showing a cam lock fastener provided on the tee, in preparation for the interconnection of the cam lock fastener onto and within a groove of a proximate unloading line or hose.

With reference to FIG. 13, another embodiment of a tee and unload hose having an integrated cam lock 150 is shown. The tee and unload hose having an integrated cam lock 150 comprises a tee 152 having an outlet end 154 having a coupler 156 and a cam lock mechanism 158. A hose 160 has a coupler end member 162 having an integral groove 162. The coupler end member 162 fits into the coupler 156 and the cam lock mechanism 158 is used to secure the couplers 156 and 162 together. As can be appreciated, a distinction between the tee and unload hose having an integrated cam lock 150 and the tee 10 and the coupler 60 is that the groove 164 is formed in the coupler 162 and not in the tee 152.

Figure 14:
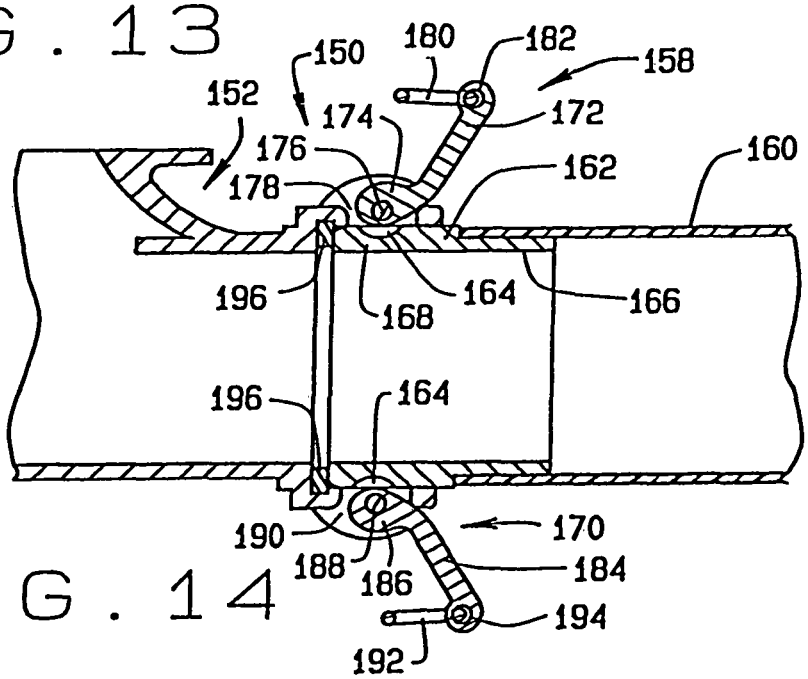
FIG. 14 is a partial cross-sectional view of the tee shown in FIG. 13 with a pair of cam lock fasteners prior to being fastened.

FIG. 14 is cross-sectional view of the coupler 162 being inserted into the coupler 156. The coupler 162 has an extension member 166 that extends into the hose 160. The member 166 may be secured to the hose 160 by a locking band (not shown) or by any other suitable securing device. The coupling 162 has an outer sleeve 168 that is adapted to fit within the coupler 156. The coupler 156 is shown having the first cam lock mechanism 158 and a second cam lock mechanism 170. Although two cam lock mechanisms 158 and 170 are shown, it is contemplated to have more than two. The first cam lock mechanism 158 comprises a cam arm member 172 having an integral cam 174 mounted on a pivot pin 176. The cam arm member 172 is used to pivot the integral cam 174 about the pivot pin 176. The coupler 156 has a first slot 178 through which the integral cam 174 may pass to contact the groove 164 of the coupler 162. A ring 180 is attached to the cam arm 172 through an aperture 182 formed in the cam arm 172. The second cam lock mechanism 170 comprises a cam arm member 184 having an integral cam 186 mounted on a pivot pin 188. The cam arm member 184 may be pivoted about the pivot pin 188 to move or rotate the integral cam 186. The coupler 156 also has a second slot 190 formed therein through which the integral cam 186 may enter to contact the groove 164 formed in the coupler 162. A ring 192 is connected to the cam arm 184 through an aperture 194 provided in the cam arm 184. A gasket 196 may be provided between the coupler 156 and 162 to align the tee 152 with the coupler 162. The gasket 196 also provides for a uniformity of diameter between the tee 152 and the coupler 162 to assure that there is no area where any bulk material can accumulate or become embedded.

Figure 15:
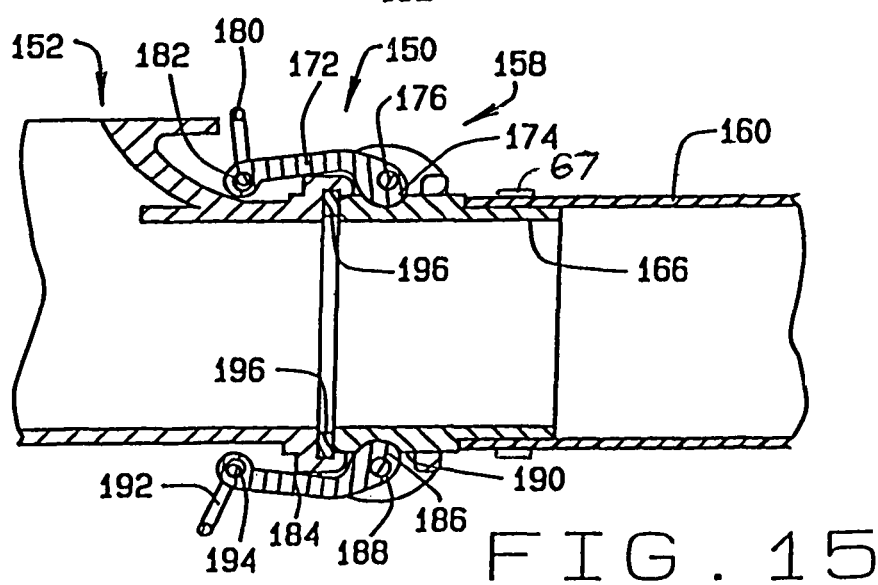
FIG. 15 is a partial cross-sectional view of the tee shown in FIG. 14 with the pair of cam lock fasteners being fastened.

Referring now to FIG. 15, a cross-sectional view of the coupler 162 and the tee 152 being connected together and the cam lock mechanisms 164 and 170 both in a locked position are shown. The cam arm 172 has been pressed down to pivot the integral cam 174 into the groove 164. The cam arm 184 has also been pivoted downwardly to move the integral cam 186 into engagement with the groove 164. With the integral cams 174 and 186 engaging the groove 164, the coupler 156 will be locked in place on the coupler 162. An unloading of any bulk material from a bulk storage container may take place when the coupler 156 is secured to the coupler 162. Also, the rings 180 and 192 may be tied down to maintain the cam lock mechanisms 164 and 170 in the locked position. During an unloading process, since there are various pressures and forces that are acting upon internally of the tee 152 and the unloading line 160, that may generate some impact or vibrations, some form of connection may be needed to assure that the cam fasteners 164 and 170 remain intact and locked and the rings 180 and 192 may be used for this purpose. As can be appreciated, a single installer or individual may easily position the coupler 162 into the coupler 156 and then press down on both the arms 172 and 184 to lock the coupler 156 in place. Further, due to the groove 164, no special care or locating is required in positioning the coupler 162 within the coupler 156.

As has been shown above, an unloading hopper tee having a groove with the tee being secured to the underside of a bin of a tank trailer, railroad car, other hopper, or bulk storage container is used in combination with a coupler having a cam locking mechanism that is secured to the groove formed in the tee. This construction allows installation of the coupler onto the tee to be accomplished by a single installer to reduce manpower and time consumed in setting up or unloading operation of the bulk storage container. In addition, the efficiency in the operations of the installed flow line, so as to reduce any turbulence, and to avoid any gaps or notches where the granular material may become embedded, and to avoid contamination of any subsequent bulk material loads, is prevented by use of the present disclosure. Since the tee and the unloading line or hose are maintained in alignment, and have the same interior diameter, the flow path of the bulk material is uniform which reduces the potential for abrasive wear of these components during usage. The tee and coupler allow for quick connection and disconnection as may be required.

From all that has been said, it will be clear that there has thus been shown and described herein a tee and unload line with an integrated cam lock. It will become apparent to those skilled in the art; however, that many changes, modifications, variations, and other uses and applications of the subject tee and unload line with an integrated cam lock are possible and contemplated. All changes, modifications, variations, and other uses and applications which do not depart from the spirit and scope of the disclosure are deemed to be covered by the disclosure, which is limited only by the claims which follow.

What is claimed is:

1. A grooved lock coupler for holding a tee to a flow line for conveyance and unloading of dry bulk granular material from a tank trailer vehicle comprising:

a tee having a first end, a second outlet end, and an inlet upper end, and having a circumferential external groove integrally provided on said second outlet end;

a coupler for interconnecting to a flow line leading from the tee, the coupler having a first cam lock mechanism pivotally mounted on the coupler, and a second cam lock mechanism pivotally mounted on the coupler, the coupler having a first slot formed therein and a second slot formed therein, the first cam lock mechanism cooperating with the first slot to allow the first cam lock mechanism to extend through the first slot to engage with the groove of said tee, the second cam lock mechanism cooperating with the second slot to allow the second cam lock mechanism to extend through the second slot to engage with the groove of the said tee to lock the flow line and coupler to the tee in preparation for an unloading process, and the coupler having an extension member extending into the flow line to prevent any bulk granular material from accumulating between the tee, the coupler, and the flow line during operation;

said tee, coupler and flow line being free of any threaded connection therein;

at least one locking band secures said flow line onto the extension member of the coupler during assembly;

a gasket provided internally between the coupler and the second outlet end of the tee to provide a uniform diameter through the tee and coupler as granular material flows from the tee and into the flow line during discharging of granular material and to prevent the granular material from accumulating thereat;

said first cam lock fastener comprises, a cam lock arm having an aperture and a pivot pin inserted through the aperture to provide for pivoting of the cam lock arm, and wherein said first cam lock fastener further comprises a cam that can be pivoted between an unlocked position with respect to the groove and a locked position within said groove;

said second cam lock fastener comprises another cam lock arm having an aperture and a pivot pin inserted through the aperture to provide for pivoting of said cam lock arm;

a flange positioned around the inlet upper end of the tee, said flange having bolt holes for receiving bolts for securing the flange to the tank trailer vehicle; and wherein upon unloading of the dry bulk granular material from the tank trailer vehicle and through the tee into the flow line prevents the accumulation of any granular material from collecting between the tee, the coupler, and the flow line, during functioning.

2. The grooved lock coupler of claim 1 wherein the cam lock fastener further comprises another aperture formed in the cam lock arm and a ring inserted into the another aperture.

* * * * *